Figure 1:
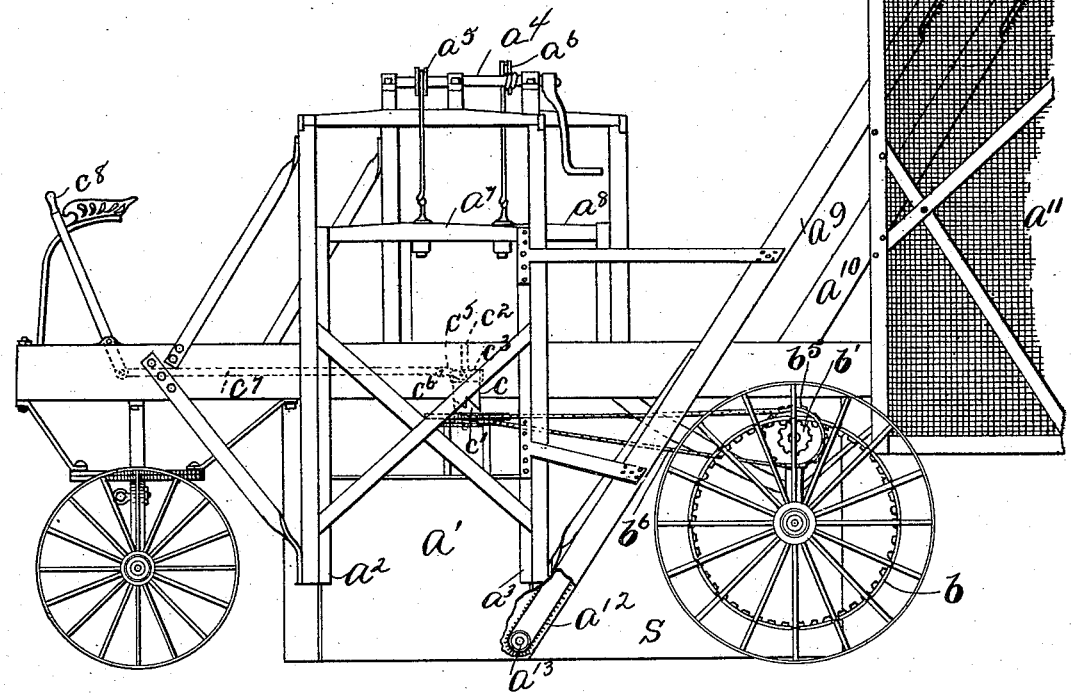

(No Model.) 6 Sheets—Sheet 1.
W. A. TURNER.
COTTON PICKING MACHINE.

No. 572,493. Patented Dec. 1, 1896.

Witnesses:
George L. Cragg
Harriet G. Templeton

Inventor:
William A. Turner.
By Barton + Brown
Attorneys (No Model.)   6 Sheets—Sheet 2.
W. A. TURNER.
COTTON PICKING MACHINE.
No. 572,493.   Patented Dec. 1, 1896.
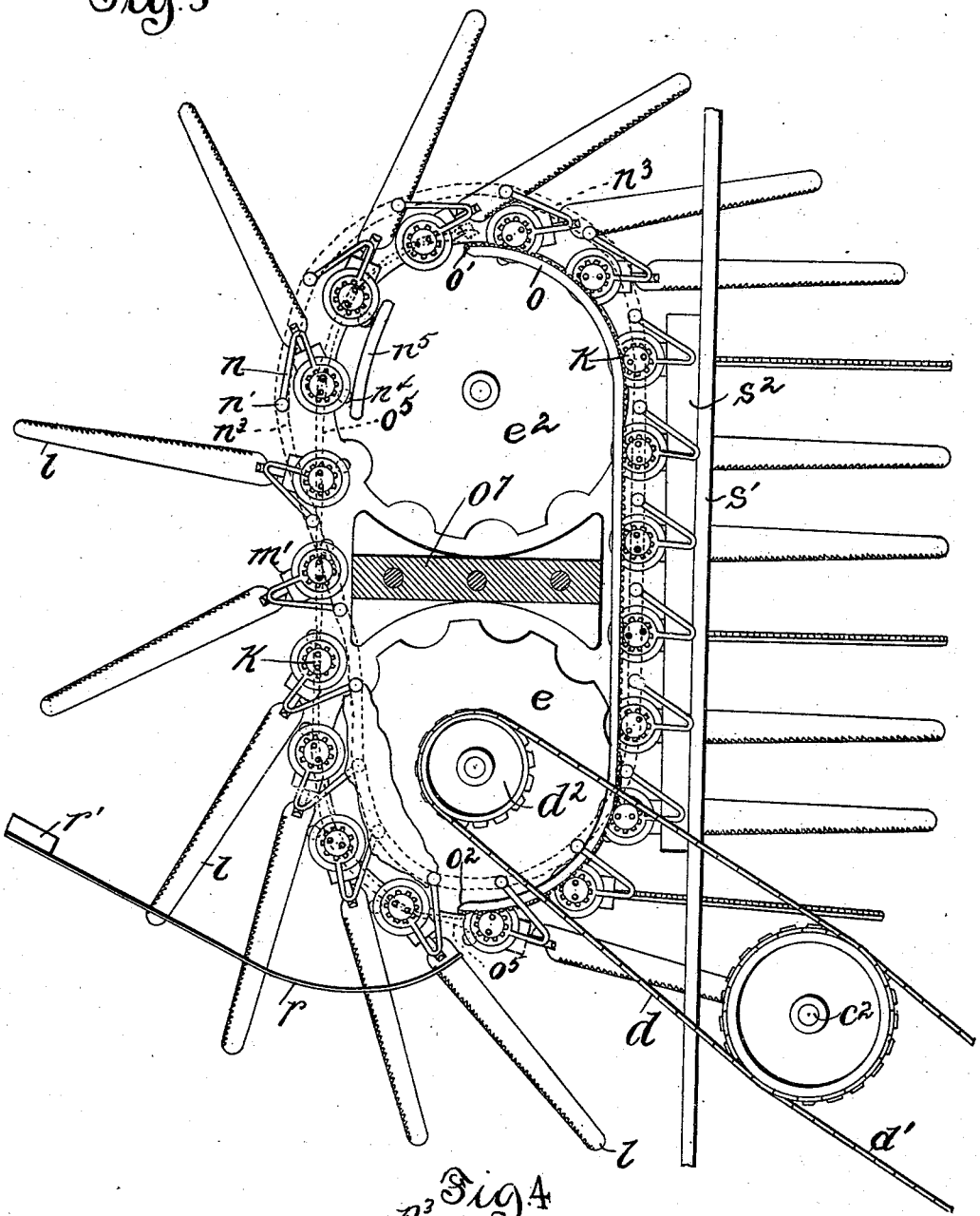
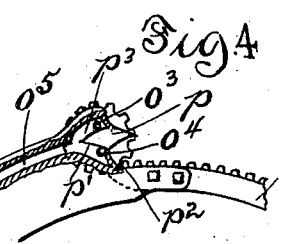
Witnesses:
George L. Cragg
Harriet G. Pendleton
Inventor:
William A. Turner
By Barton & Brown
Attorneys (No Model.) 6 Sheets—Sheet 3.
W. A. TURNER.
COTTON PICKING MACHINE.
No. 572,493. Patented Dec. 1, 1896.
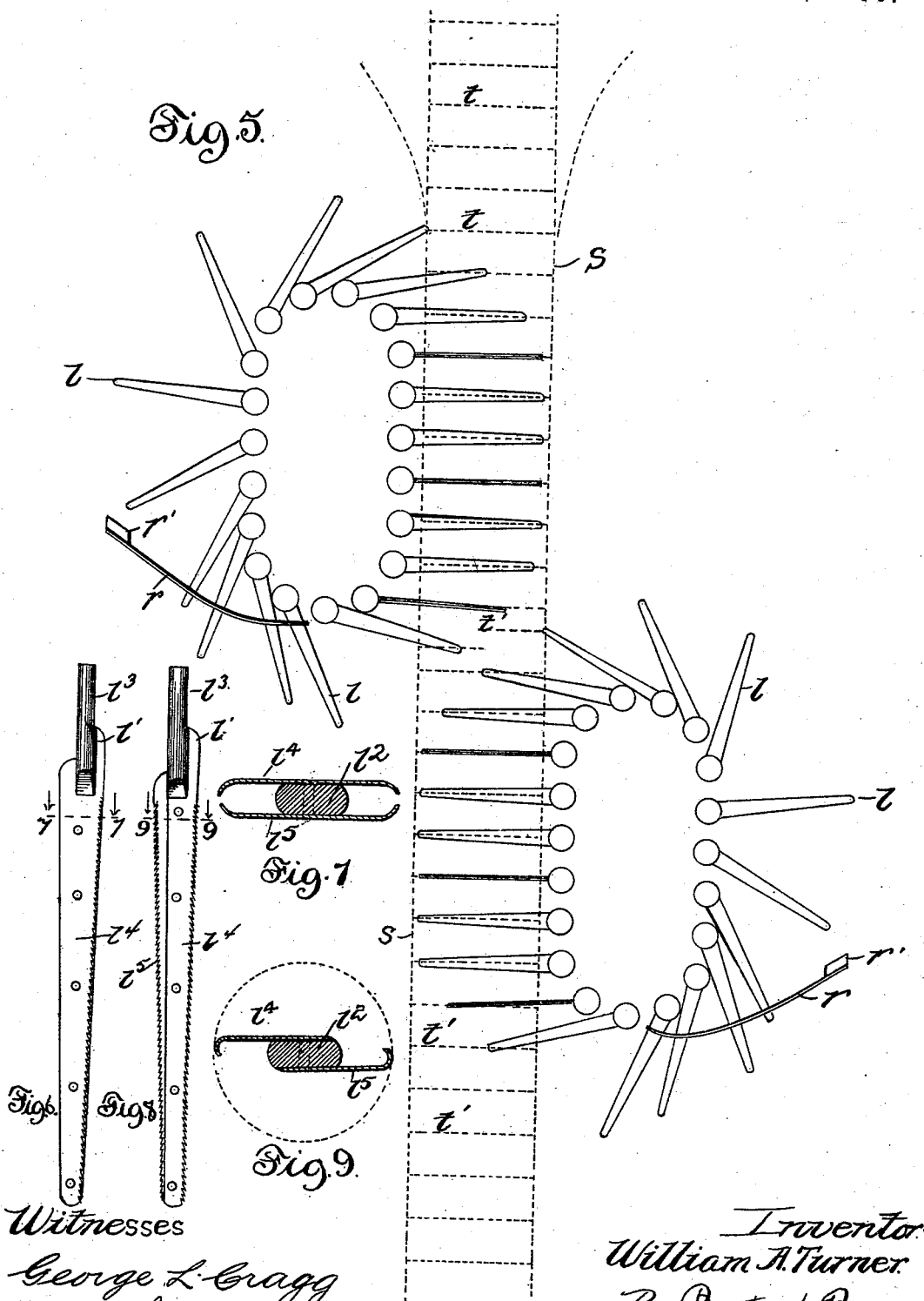

(No Model.) 6 Sheets—Sheet 4.
W. A. TURNER.
COTTON PICKING MACHINE.
No. 572,493. Patented Dec. 1, 1896.
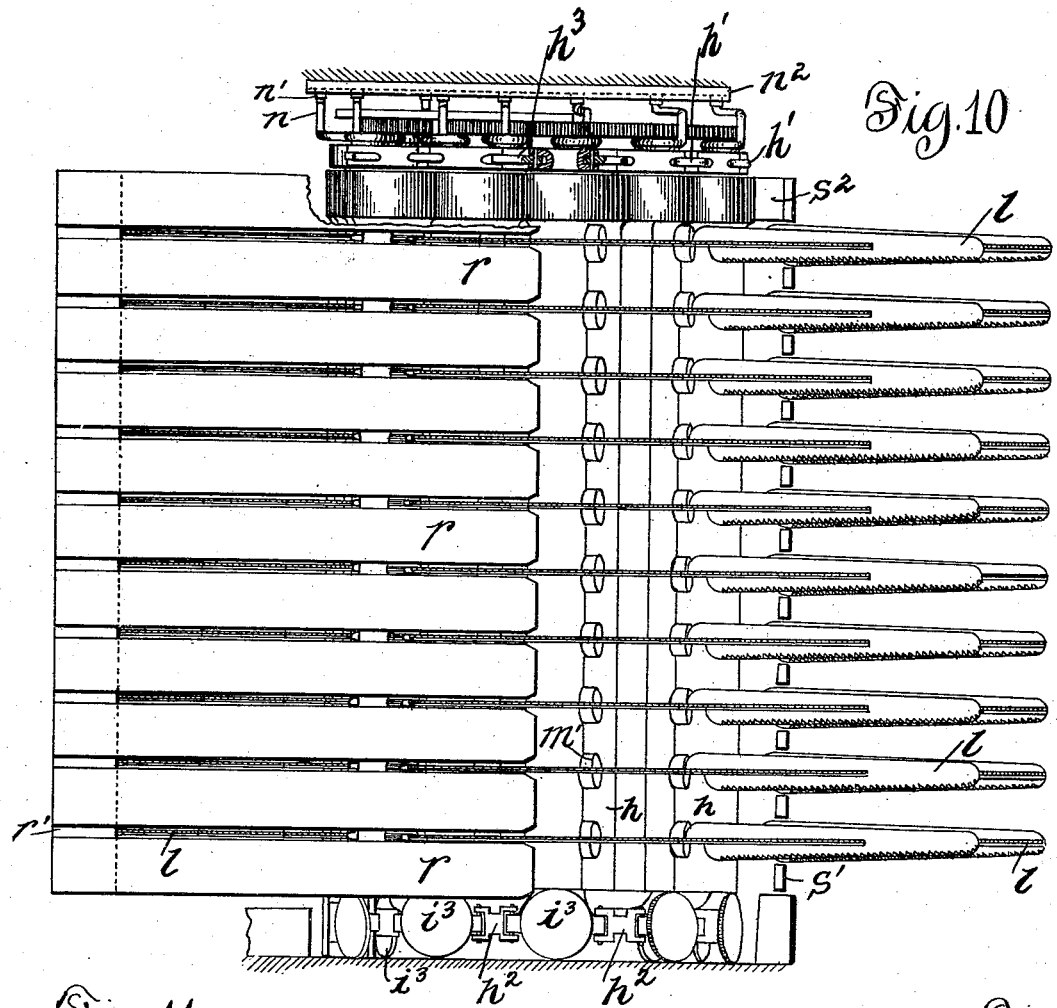
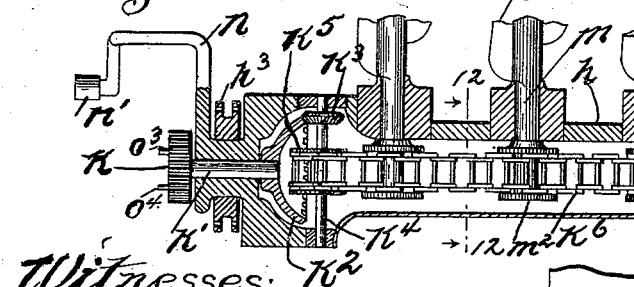
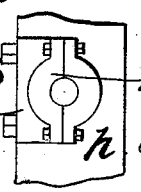
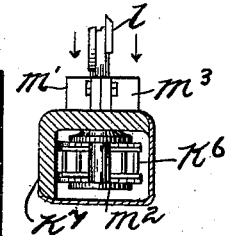

(No Model.)
W. A. TURNER.
COTTON PICKING MACHINE.
No. 572,493.　　　　　　　　Patented Dec. 1, 1896.
6 Sheets—Sheet 5.
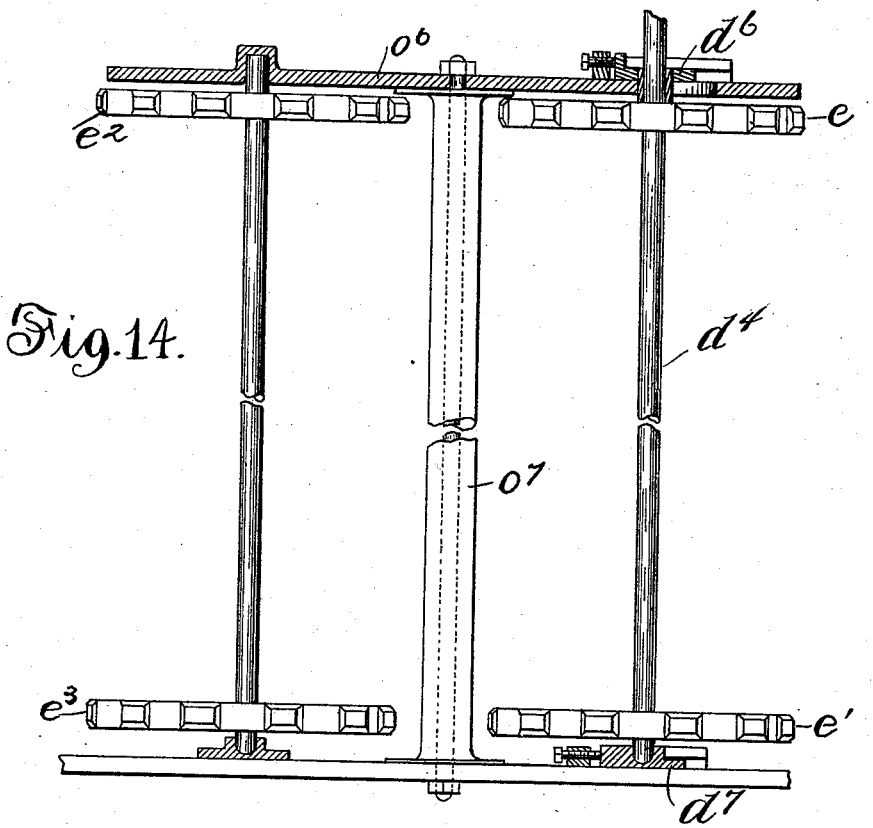
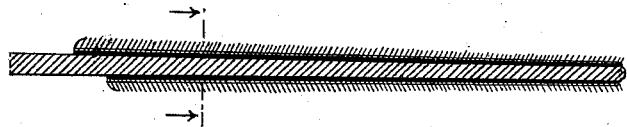
Witnesses:
George L. Cragg
Harriet G. Pembleton
Inventor:
William A. Turner.
By Barton & Brown
Attorneys (No Model.) 6 Sheets—Sheet 6.

W. A. TURNER.
COTTON PICKING MACHINE.

No. 572,493. Patented Dec. 1, 1896.

Witnesses:
George L. Cragg.
W. Clyde Jones.

Inventor:
William A. Turner.
By Barton & Brown
Attorneys.

UNITED STATES PATENT OFFICE.

WILLIAM A. TURNER, OF CHICAGO, ILLINOIS, ASSIGNOR TO THE CHICAGO COTTON PICKER COMPANY, OF SAME PLACE.

COTTON-PICKING MACHINE.

SPECIFICATION forming part of Letters Patent No. 572,493, dated December 1, 1896.

Application filed February 10, 1894. Serial No. 499,764. (No model.)

*To all whom it may concern:*

Be it known that I, WILLIAM A. TURNER, a citizen of the United States, residing at Chicago, in the county of Cook and State of Illinois, have invented a certain new and useful Improvement in Cotton-Picking Machines, of which the following is a full, clear, concise, and exact description, reference being had to the accompanying drawings, forming a part of this specification.

My invention relates to a machine for picking cotton; and its object is to provide a machine that shall embody simplicity of construction and that shall effectively and thoroughly remove the cotton from the plants.

My invention in its preferred form comprises picking-fingers adapted to be inserted into and withdrawn from the plant to engage and remove the cotton therefrom, the picking-fingers being then passed between cleaning-fingers, which remove the cotton therefrom, the cotton being then conveyed to a receptacle carried upon the machine. The picking-fingers are made flat and are provided upon their edges with serrations or teeth, which engage the cotton fibers as the fingers are axially rotated, the cotton-seeds with their clinging tufts of fibers being thus removed from their bolls and carried to the cleaning-fingers, which are located at such a distance apart that the seeds in the lint will not readily pass through, the seeds with their clinging tufts of cotton being thus stopped in their travel and the picking-fingers withdrawn therefrom, the picking-fingers being provided with a taper, which, coacting with the slant of the teeth or serrations of the edges, permits the easy withdrawal of the fingers. The picking-fingers are mounted upon vertical supports which travel in an oblong path, the fingers lying with their axes perpendicular to said support, about which axes they are adapted to be rotated by proper mechanism. The travel of the support while the picking-fingers are in the plant is in a direction opposite to that of the advance of the machine, and the picking-finger is caused to enter and leave the plant with its point traveling approximately in a straight line, thus preventing the slapping of the plant. The fingers are mounted in two sets, one adapted to enter the plant from one side and to pick along lines several inches apart vertically and horizontally, while the second set is adapted to enter the plant from the opposite side and pick along intermediate lines, the cotton being thus thoroughly picked from the plant.

I will describe my invention more in detail in connection with the accompanying drawings, in which—

Figure 2:
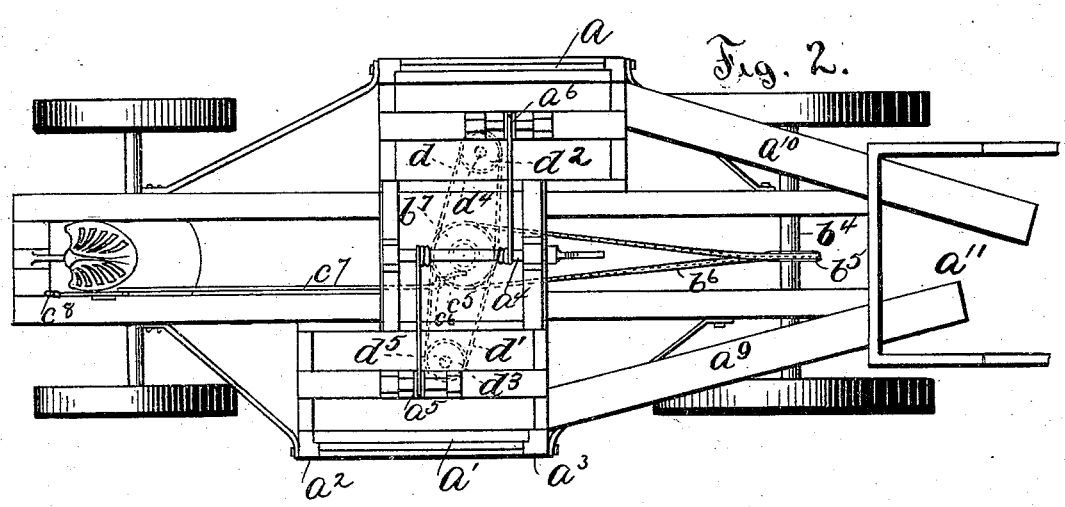
Figure 18:
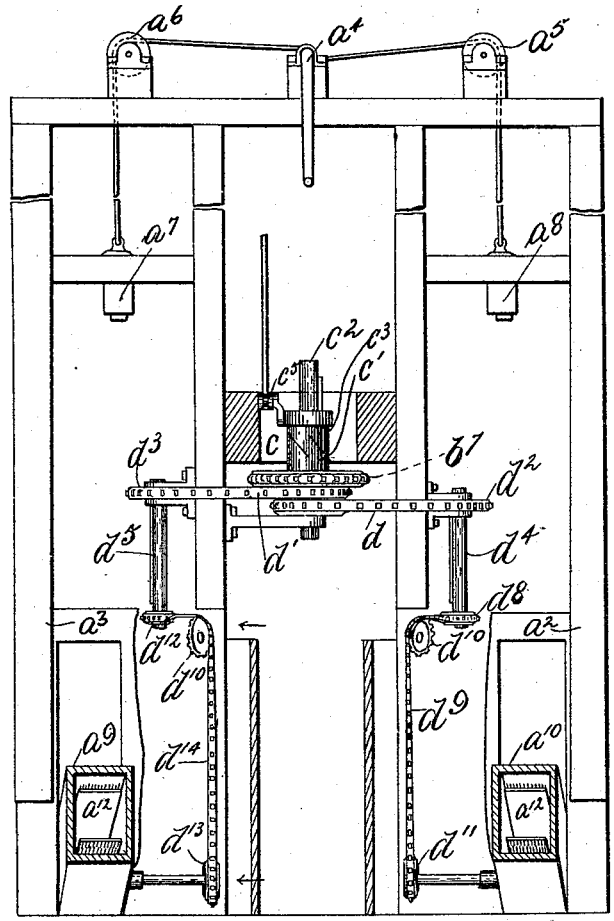
Figure 19:
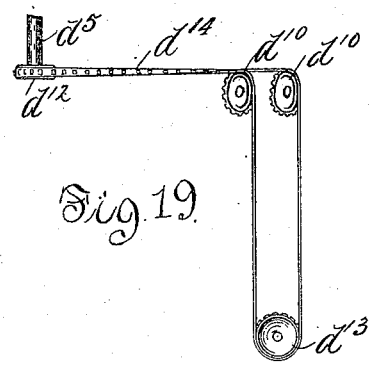

Figure 1 is an elevational view of a machine embodying my invention. Fig. 2 is a plan view thereof. Fig. 3 is a plan view of one set of picking and cleaning fingers. Fig. 4 is a detail view of the mechanism for starting the finger-rotating pinions properly on the rack. Fig. 5 is a diagrammatic view illustrating the movements of the picking-fingers. Fig. 6 is a view of the picking-finger. Fig. 7 is a sectional view thereof on line 7 7, Fig. 6. Fig. 8 is a modified form of the picking-finger. Fig. 9 is a sectional view thereof on line 9 9, Fig. 8. Fig. 10 is an elevational view of the picking and cleaning fingers. Fig. 11 is a vertical sectional view of one of the picking-finger supports. Fig. 12 is a transverse sectional view thereof on line 12 12, Fig. 11. Fig. 13 is a detail view of one of the boxes in which the picking-fingers are journaled. Fig. 14 is a view of the sprocket-wheels for rotating the chains upon which the upright supports are carried, the chains and supports being removed. Fig. 15 is a view of a spiral finger having a flat cross-section. Fig. 16 is a longitudinal sectional view of a flat finger in which bristles or fine wires constitute the picking-surfaces. Fig. 17 is a transverse sectional view thereof. Fig. 18 is a view illustrating the mechanism for driving the picking-fingers and the conveyers. Fig. 19 is a detached view looking in the direction of the arrows in Fig. 18.

Like letters refer to like parts in the several figures.

The picking mechanism is duplicated, one set of picking and cleaning fingers being located upon each side of the machine, the machine while in operation straddling a row of cotton-plants.

The picking mechanisms are located within the boxes $a\ a'$, which are vertically movable in guideways $a^2\ a^3$, the raising and lowering of the boxes being accomplished through the agency of the windlass $a^4$, ropes secured to and winding about the spindle of which, after passing over pulleys $a^5\,a^6$, pass downward and are secured to the horizontal beams $a^7\,a^8$, from which the boxes are suspended. The conveyers $a^9\,a^{10}$ are supported upon the boxes $a$ and $a'$, respectively, their upper ends extending into the cotton-receptacle $a^{11}$, carried upon the rear of the machine. The conveyers may comprise a belt $a^{12}$, traveling over pulleys $a^{13}\,a^{13}$, the surface of the belt carrying suitable projections for engaging the cotton and conveying it into the cotton-receptacle. The belt may be driven in any suitable manner, but I prefer to employ the driving mechanism illustrated in Figs. 18 and 19, in which a sprocket-wheel $d^8$ is mounted upon shaft $d^4$ and geared by means of sprocket-chain $d^9$, passing over idlers $d^{10}$, with sprocket-wheel $d^{11}$, mounted to rotate with the pulley about which the conveyer-belt passes. Likewise sprocket-wheel $d^{12}$ is mounted upon shaft $d^5$ and geared with sprocket-wheel $d^{13}$ by chain $d^{14}$, passing over idlers $d^{10}\,d^{10}$. The lower end of the belt is so situated that the cotton after being removed from the picking-fingers may fall upon the belt.

Upon the rear wheels are provided internally-toothed gear-wheels $b$, engaging with which are pinions $b'$, mounted upon a shaft $b^4$. Upon the shaft $b^4$ is mounted a sprocket-wheel $b^5$, which drives by means of a chain $b^6$ a sprocket-wheel $b^7$, rotating about a vertical axis. Upon the shaft $b^4$ and between the sprocket-wheel $b^5$ and the pinions $b'$ are provided ratchet-wheel couplings of well-known construction for the purpose of permitting one wheel to move faster than the other, as when the machine is turning, but as these form no part of the present invention they have been omitted from the drawings for clearness. The wheel $b^7$ is rotatable with one member $c'$ of a clutch $c$ and is mounted loosely upon the shaft $c^2$. The other member, $c^3$, of the clutch is movable longitudinally upon the shaft $c^2$, but is prevented from turning relatively thereto by means of a key engaging with a keyway in the sprocket-wheel. The member $c^3$ of the clutch is engaged by the end of a bell-crank $c^5$, pivoted at $c^6$, the other arm of the bell-crank being connected by means of a link $c^7$ with a handle $c^8$, whereby the clutch may be operated to throw the picking mechanism into and out of gear. The shaft $c^2$ carries sprocket-wheels which are connected by means of chains $d$ and $d'$ with sprocket-wheels $d^2\,d^3$, mounted upon shafts $d^4\,d^5$. The sprocket-wheels $d^2$ and $d^3$ are so mounted, through the provision of keys engaging keyways in the wheels, that the boxes $a$ and $a'$ may be raised and lowered. The adjustable boxes $d^6$ and $d^7$ upon the shaft $d^4$ are for the purpose of providing proper tension to the chains or linkage at the top and bottom of the vertical supports $h$.

Carried upon the shaft $d^4$ are the sprocket-wheels $e$ and $e'$. The vertical supports $h$ are linked together at the top and bottom by links $h'\,h'$ and $h^2\,h^2$. The upper portions of the vertical supports are encircled by collars $h^3$, which are linked together by the links $h'$, the rotation of the support upon its vertical axis being thus permitted. The teeth of the sprocket-wheels $e$ and $e^2$ engage the collars $h^3$ to impart to the supports movement of translation. At the lower end of the support is provided a bearing-block $i$, in the top of which is provided a centrally-located pin $i'$, adapted to engage an opening in the plate $i^2$, provided upon the support, to permit the rotation of the support relatively to the bearing-block $i$. The several bearing-blocks are connected together by the links $h^2$, the inner faces of said blocks being of circular contour, whereby they may be engaged by the sprocket-wheels $e'$ and $e^3$ to assist in imparting to the supports their motion of translation. Upon the blocks $i$ are journaled the rollers $i^3$, which, traveling upon a metallic track, serve to support the picking mechanism, the weight of the supports being imposed thereon.

At the upper end of the support is provided a pinion $k$, carried upon a shaft $k'$, a cup-shaped bevel-gear $k^2$ being mounted upon the lower end of said shaft and engaging with a bevel-pinion $k^3$, carried upon the horizontally-journaled shaft $k^4$. Upon the shaft $k^4$ is carried the sprocket-pinion $k^5$, which when rotated imparts motion to the chain $k^6$. The picking-fingers $l$ are mounted upon the shafts $m$, journaled in boxes $m'$, which are provided with removable caps $m^3$, whereby the fingers, with the pinions $m^2$ carried upon the ends thereof, may be readily removed for repair. The pinions $m^2$ are engaged by the chain $k^6$ in its travel and thus caused to rotate to impart axial rotation to the picking-fingers $l$. As shown in Fig. 12, one side of the chain $k^6$ bears against the wall $k^7$ of the support to prevent the outward movement of the chain when engaged by the teeth of the pinions $m^2$. To the upper part of the support and rigidly mounted thereon is an arm $n$, which carries upon its end a cam-roller $n'$, adapted to engage a cam-slot to impart to the support a rotary movement in a manner and for a purpose hereinafter described.

The pinions $k$, carried upon the supports, are adapted to engage a rack-bar $o$ as they advance, the pinions being thereby rotated to impart to the picking-fingers their axial rotation. A bar $s^2$ is located near the upper ends of the vertical supports carrying the picking-fingers to limit the outward movement of the upper ends of the supports due to the thrust of the pinions engaging with the rack $o$. The rack $o$ is carried upon the plate $o^6$, which is supported by the standard $o^7$, extending upward between the sprocket-wheels, said plate $o^6$ being provided with bearings, through which the shafts upon which the sprocket-wheels are mounted pass to assist in maintaining the rack in position when subjected to the thrust of the pinions.

As it is required that the picking-fingers rotate only while within the plant, the rack $o$ terminates at the points $o'$ $o^2$, the teeth of the pinions $k$ during the remainder of the travel of the supports remaining unengaged. Upon the pinions are provided two diametrically-situated pins $o^3$ $o^4$, which, just as the pinion leaves the rack, engage the flaring walls of the slot $o^5$ to bring the pinions to rest, the walls of the slot converging and being for a short distance of a width equal to the thickness of the pins, the pinions being thus brought completely to rest. The picking-fingers are thus brought to rest with their dimension of width lying in a horizontal plane, and then enter and pass through the cleaning-fingers, the slot $o^5$ being of increased width while the picking-fingers are passing between the cleaning-fingers to allow freedom of motion of the pins, the picking-fingers meanwhile being maintained in a horizontal position by engagement with the cleaning-fingers. The slot $o^5$ then converges so that just as the picking-fingers leave the cleaning-fingers the pins are brought into position one behind the other, ready to engage a block $p$, located at the end of the slot, against the oblique edge $p'$ of which the advance pin $o^4$ impinges, thus causing the pinion to rotate and the tooth $p^2$ immediately in advance of said pin to engage the first tooth of the rack, the rear pin $o^3$, as the pinion rotates, passing through the slot $p^3$. Thus the same tooth of the pinion is each time caused to engage the first tooth of the rack, and the pinions and rack are so proportioned that when the pinion reaches the opposite end $o^2$ of the rack the finger lies with its greater diameter horizontal, so that it may pass between the cleaning-fingers $r$. The block $p$, besides causing the same tooth of the pinion each time to engage the first tooth of the rack, acts to impart to the pinion a rotation upon its axis, so that when it engages with the rack it is rotating at full speed. To accomplish this, the oblique edge $p'$ is provided at the end next the rack with a curve which closely approximates in form the cycloidal curve that pin $o^4$ would generate when the pinion is rotating at full speed. The portion of the curve leading up to the cycloidal portion is so formed that when the pin $o^4$ strikes the oblique edge $p'$ the pinion is started to rotate, the speed being increased, as the pin $o^4$ advances, by the increasing obliquity of the edge $p'$, until when the teeth of the pinion engage the rack the pinion is rotating at full speed.

To further assure the entrance of the finger between the cleaning-fingers flatwise, the base of the finger proper is longer upon one side than upon the other, so that the end $l'$ of the longer side striking against the end of one of the cleaning-fingers assists in rotating the picking-finger into a horizontal position. Instead of providing two pins upon the pinion $k$, but one pin may be used, in which case the operation would be practically the same, though I prefer the construction shown.

Since the fingers should enter the plant point first to prevent slapping the same, and should remain perpendicular to the direction of the motion of the machine while in the plant, and then be passed through the cleaning-fingers in an axial direction, it becomes necessary to rotate the supports carrying the fingers to move the fingers into these several positions. To accomplish this, the cam-roller $n'$, carried upon the end of the arm $n$, is adapted to engage a cam-channel $n^3$ in the plate $n^2$, the shape of the channel being indicated by dotted lines in Fig. 3. The shape is such that the cam-roller $n'$, engaging therewith, properly rotates the finger-supports, causing the picking-fingers to enter the plant point first, to remain perpendicular to the line of travel of the machine while in the plant, to be withdrawn from the plant point last, and then to pass between the cleaning-fingers while moving in an axial direction, and, finally, rotating sufficiently to bring the point in position to again enter the plant. To assist the roller $n'$ in rotating the vertical supports after the picking-fingers have passed between the cleaning-fingers and before they enter the plant, which rotation is necessarily a rapid one, an auxiliary roller $n^4$ may be provided, journaled in the side of the vertical support and adapted to engage a cam-surface $n^5$, whose distance from the vertical support gradually decreases as the support advances, the roller $n^4$ being thus gradually thrust outward to rotate the support on its axis. The auxiliary roller $n^4$ is not essential, though it permits the arm $n$ to be made considerably lighter.

The cleaning-fingers $r$, between which the picking-fingers pass, are mounted upon vertical supports $r'$ and are curved so that the picking-fingers in passing between them may remain approximately perpendicular thereto at all points to facilitate the removal of the cotton. The ends of the cleaning-fingers may be slightly pointed to guide the picking-fingers and cause them to assume a horizontal position in passing between the same.

The picking-finger is made with a flat transverse section, so that it may pass between the cleaning-fingers, teeth or serrations being provided upon the edges for engaging the cotton fibers. By "flat transverse section" is to be understood a transverse section which presents a greater dimension of width than thickness. The cleaning-fingers are placed at such a distance apart that the picking-fingers may pass between the cleaning-fingers. The picking-finger is made tapering toward the free end, so that the cotton may be readily removed by the withdrawal of the finger, the teeth slanting in the direction of the free end for a similar purpose. The finger may comprise a central support $l^2$, integral with the shank $l^3$, plates $l^4$ $l^5$ being secured to the support $l^2$ in any convenient manner, one edge of each of the plates being toothed or serrated for the purpose of grasping the cotton fibers, the opposed edge of the other plate serving as a guard, or the guard may be omitted, as shown in Figs. 8 and 9.

While I provide picking-surfaces upon the edges of the fingers only, such surfaces may be provided at other points. In fact, the entire finger may be covered with such surfaces; but I prefer to provide the picking-surfaces only at the edges, leaving the flat sides of the finger smooth to facilitate the withdrawal of the cotton.

In Fig. 15 I have illustrated a spiral picking-finger of flat cross-section, the picking-surfaces being provided upon the edges. When this form of finger is used, it will be rotated upon its axis as it passes through the cleaning-fingers. In Figs. 16 and 17 is illustrated another form of flat finger, the picking-surfaces being formed of a series of bristles or small wires slanting toward the narrow end of the finger to facilitate the removal of the cotton. Plates may be provided upon the sides when this construction is used to serve as guards.

In Fig. 5 the relative location of the two sets of picking-fingers is illustrated, one set being adapted to enter the plants from one side, while the other set enters from the opposite side. Guide-boards $s$ are carried upon the boxes $a\ a'$, curving outward at the forward end to gather the branches of the plant together and compress them when of greater width than the length of the fingers, so that the fingers may pass completely through the plant to thoroughly remove the cotton therefrom, the guide-boards being provided with slots, as shown in Fig. 10, to permit the fingers to enter and leave the center passage-way, the slots being of considerable width where the fingers leave the passage-way loaded with cotton. The object of the guide-bars $s'$ thus formed by the provision of slots in the guide-boards $s$ is to prevent the branches of the plant from entering the mechanism. The top of the passage-way is covered to bring stray branches within reach of the picking-fingers. The parallel dotted lines $t\ t$ illustrate the loci of the points of the fingers, the points entering and receding from the plants on a straight line, thus picking all of the cotton in the vicinity of the location of the line without slapping the plant. The vertical supports, having a movement to the rear at the same rate that they are advanced by the travel of the machine, in consequence remain stationary relatively to the plant, the finger being thus inserted into the plant, where it remains for a short time and then withdrawing, meanwhile rotating axially to gather such cotton fibers as may lie in the vicinity, thus withdrawing the cotton-seeds, with the cotton clinging thereto, from the bolls. The fingers of the second set, instead of moving along the parallel lines $t$, may be caused to travel along intermediate lines $t'$, a thorough picking of the cotton being thus secured.

I will now describe, briefly, the operation of the machine.

The machine, in advancing, straddles a row of cotton-plants, the plants being gathered between the guides $s$. The picking-fingers are caused to enter and leave the plants approximately along the indicated lines, meanwhile rotating axially, thus picking the cotton. Just before the picking-fingers reach the cleaning-fingers the pinions pass from the end of the rack $o$, and the pins $o^3\ o^4$, engaging with the slot $o^5$, bring the fingers quickly to rest. The fingers then pass flatwise through the cleaning-fingers, the vertical supports carrying the fingers being properly rotated to cause the picking-fingers to pass between the cleaning-fingers while moving in an approximately axial direction, the cotton wrapped about and clinging to the fingers being thus arrested in its travel and the picking-fingers withdrawn therefrom, the taper of the finger and the slant of the teeth coacting to facilitate the operation. The cotton then falls upon the conveyer $a^9$, which carries the cotton to the cotton-receptacle $a^{11}$. The picking-fingers, after passing between the cleaning-fingers, are brought into position to enter the plant again, point first, the movement of the fingers being accomplished by the rotation of the finger-carrying supports by means of the cam-roller $n'$ and the auxiliary roller $n^4$. As each pinion approaches the end $o'$ of the rack the pins $o^3\ o^4$ are brought into line, the forward pin, as the pinion advances, engaging the oblique surface $p'$ of block $p$, thus imparting rotation to the pinion, so that it may engage the rack while moving at full speed, the proper tooth engaging the first tooth of the rack. The operation is thus repeated, the rear set of picking-fingers picking along lines intermediate between those along which the forward set pick.

I disclaim the feature wherein the picking-fingers are mounted upon supports adapted to travel in an endless course, oblong in the direction of the length of the machine and practically straight sided, as associated with means for rotating the picking-fingers on their longitudinal axes and thrusting the same into and withdrawing the same from the plant longitudinally.

It is evident that my invention is susceptible of numerous modifications, and some of the features of my invention may be used in other connections, and I do not, therefore, desire to limit myself to the precise mechanism above described; but, Having described my invention, what I claim as new, and desire to secure by Letters Patent, is—

1. The combination with a picking-finger having an oblong transverse section, of means for axially rotating said finger while in the plant, a pair of cleaning-surfaces between which said picking-finger is adapted to be passed flatwise, and means for stopping said finger flatwise with the plane of the opening between the cleaning-surfaces, substantially as described.

2. In a cotton-picking finger, the combination with a central support, of a pair of plates mounted one upon each side of said support, said plates tapering in width toward the free end of the finger and provided upon the edge with teeth or serrations slanting toward the free end, substantially as described.

3. A cotton-picking finger comprising the plates $l^4$ $l^5$ tapering in width and provided upon their edges with teeth slanting toward the narrow ends, said plates being mounted upon the central support $l^2$ formed integral with the shank $l^3$, substantially as described.

4. In a cotton-picking machine, the combination with the axially-rotatable flat picking-fingers having a motion of translation in a closed path, of means for rotating the same during a portion of the cycle of translation, and means for maintaining the fingers with the dimension of width lying in a horizontal plane during another portion of the cycle, and a pair of cleaning-fingers between which said picking-fingers are adapted to be passed, substantially as described.

5. The combination with the vertical support, of the picking-fingers journaled therein and carrying the pinions $k$, the sprocket-wheel $k^5$, the sprocket-chain $k^6$ passing over said wheel $k^5$ and the lower of said pinions $k$ engaging the opposite sides of intermediate pinions to rotate all of said picking-fingers in the same direction, the bevel-pinion $k^3$, the cup-shaped bevel-gear $k^2$ engaging therewith, said pinion $k$ being mounted upon the same shaft with said bevel-gear $k^2$.

6. The combination with the axially-rotatable support, of the cam-roller $n'$, the cam-channel $n^3$ in which said roller is adapted to travel, the cam-roller $n^4$ carried upon said support, and the cam-surface adapted to be engaged thereby to rotate the support, substantially as described.

7. The combination with an axially-rotatable picking-finger, comprising a central support and a pair of parallel plates mounted upon opposite sides thereof, picking-points located between the planes of said plates, and cleaning-surfaces between which said finger is adapted to be passed while moving parallel to the plane of said plates.

8. The combination with a picking-finger having picking points or surfaces upon two of its opposite sides, of means for axially rotating said finger while in the plant, a pair of cleaning or stripping surfaces between which said picking-finger is adapted to be passed, and means for stopping the axial rotation of said finger with the sides not provided with picking-points in the plane of the opening between the cleaning-surfaces, substantially as described.

In witness whereof I hereunto subscribe my name this 7th day of February, A. D. 1894.

WILLIAM A. TURNER.

Witnesses:
GEORGE L. CRAGG,
HARRIET G. TEMPLETON.